United States Patent [19]
Soulant, Jr.

[11] 3,800,601
[45] Apr. 2, 1974

[54] SEA SENSOR AND DESCRIPTOR SYSTEM
[75] Inventor: Herman A. Soulant, Jr., Rockville, Md.
[73] Assignee: The United States of America as represented by the Secretary of the Navy, Washington, D.C.
[22] Filed: Nov. 12, 1970
[21] Appl. No.: 88,763

[52] U.S. Cl. ............................................. 73/170 A
[51] Int. Cl. .......................................... G01f 23/14
[58] Field of Search .............. 73/170 A; 340/2; 9/8; 328/114

[56] References Cited
UNITED STATES PATENTS
3,301,047  1/1967  Von Wald et al. ............... 73/170 A
3,367,181  2/1968  Adler ................................. 73/170 A
2,790,186  4/1957  Carapellotti ............................ 340/2
3,464,071  9/1969  Starratt .................................... 9/8 R
3,110,178  11/1963  Marks et al. ...................... 73/170 A
3,397,574  8/1968  Soulant .............................. 73/170 A Primary Examiner—Donald O. Woodiel
Assistant Examiner—Arthur E. Korkosz
Attorney, Agent, or Firm—R. S. Sciascia; Q. E. Hodges

[57] ABSTRACT

The present disclosure relates to a method of determining wave characteristics by employing a float device to measure the slope of a wave and a system for processing this measured data in accordance with the disclosed sawtooth theory of wind generated waves.

12 Claims, 5 Drawing Figures

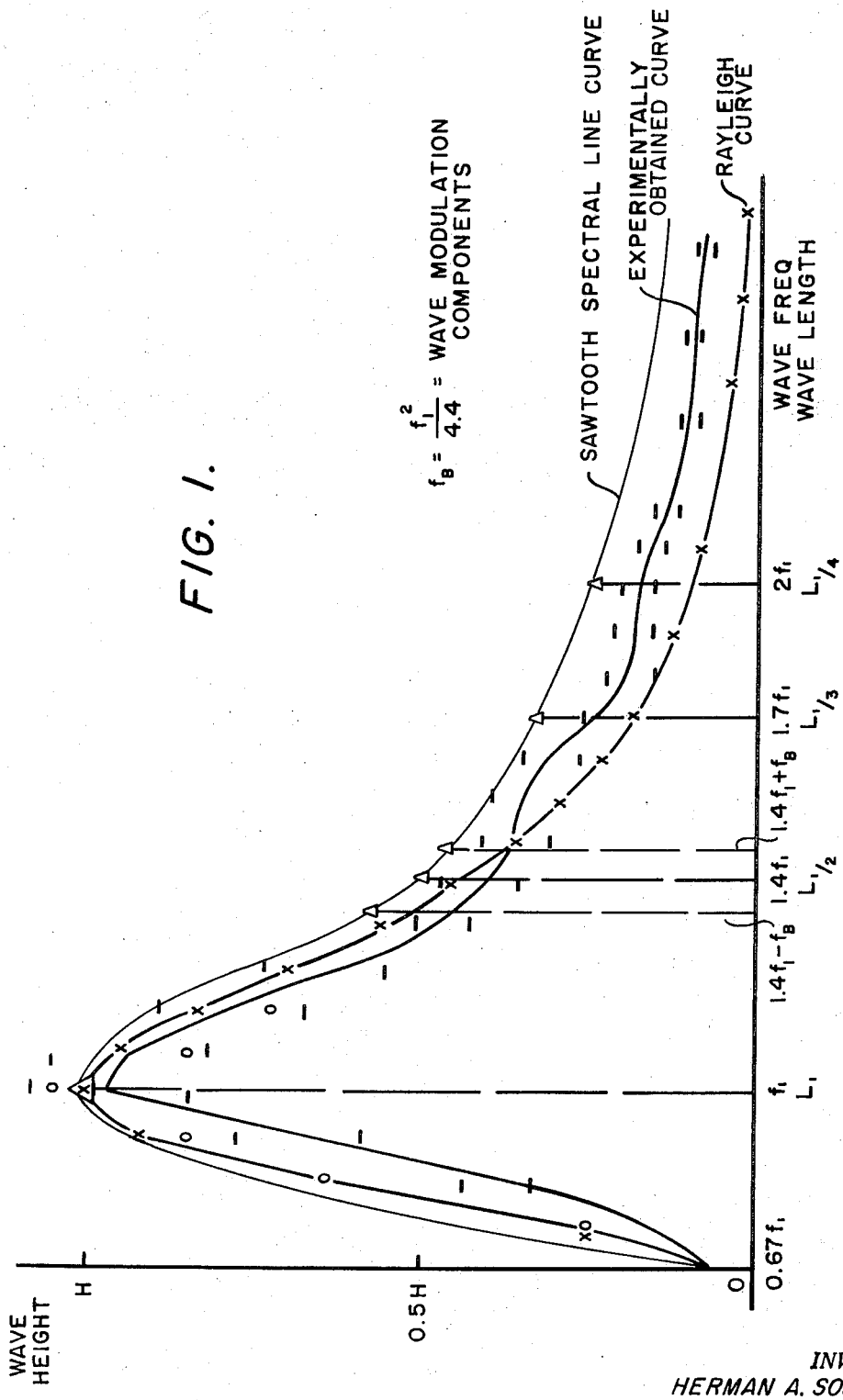

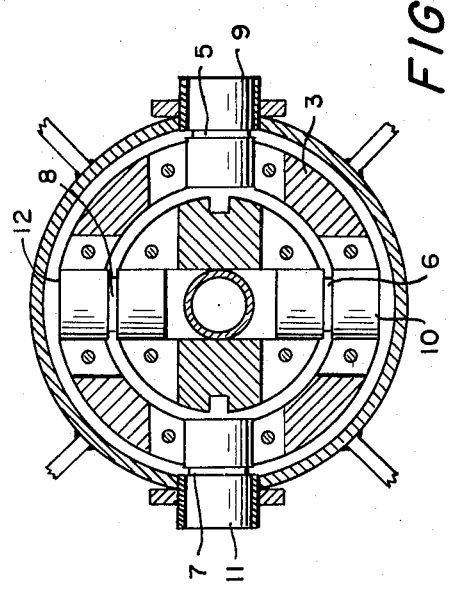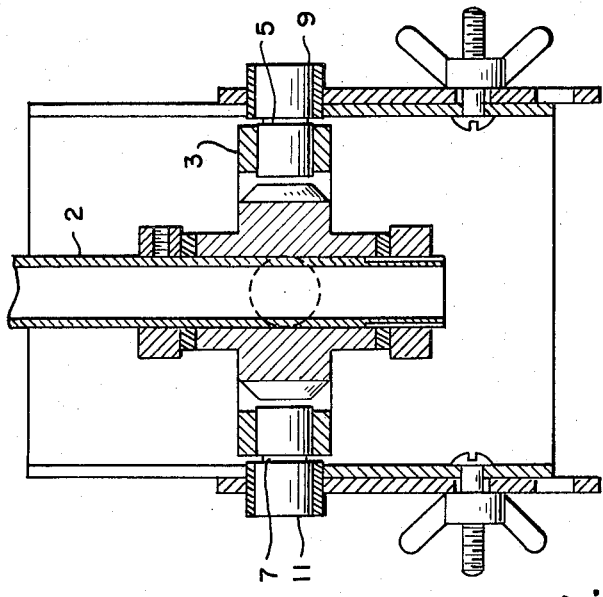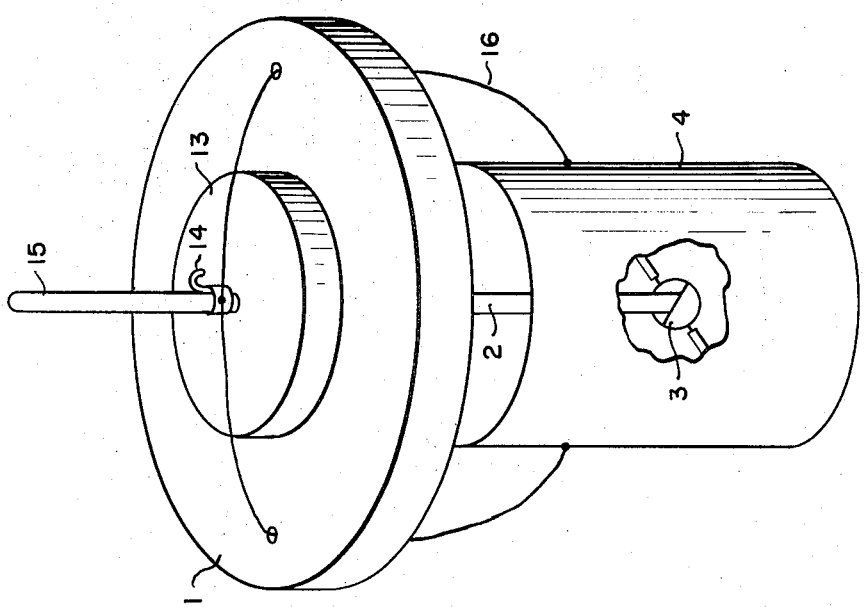

INVENTOR.
HERMAN A. SOULANT, Jr.
BY [signature]
ATTORNEY

3,800,601

SEA SENSOR AND DESCRIPTOR SYSTEM

The invention described herein may be manufactured and used by or for the Government of the United States of America for Governmental purposes without the payment of any royalties thereon or therefor.

FIELD OF THE INVENTION

Commercial shipping and naval operations could be greatly facilitated if there existed a method of measuring and characterizing wind driven water waves in the open ocean. Since a wave in one part of the ocean will propagate to other regions, the knowledge of waves at selected points in the sea would make overall wave prediction much simpler. Thus with a knowledge of the type of sea conditions a ship may encounter the speed and safety with which the ship will traverse a given course can accurately be determined. Also a more definite description of wind generated seas will aid in the design of ships for both naval and commercial use.

PRIOR ART

Many systems have attempted to predict the condition of the open sea but the accuracy of such systems have been limited by the sensing equipment and/or the mathematical model of the wave system into which the measured data is introduced.

The U.S. Pats. to Adler, No. 3,367,181 and Soulant, No. 3,397,574, discuss the difficulties encountered with prior art devices and disclose buoy like devices for measuring the slope of an ocean wave.

The overall accuracy of the systems described in both of these patents is limited by the mathematical model used to process the data obtained and thus to predict the ocean waves.

SUMMARY OF THE INVENTION

The present invention relates to a unique wave slope measuring buoy and a novel mathematical model and system for processing the data received from the buoy. Also disclosed is a system for displaying the wave information in a form acceptable to persons having the appropriate marine interest.

BRIEF DESCRIPTION OF THE DRAWINGS

FIG. 1. Theoretical and actual plot of wave height vs. wave frequency or wave length.

FIG. 2. Perspective view of the sensor buoy.

FIG. 3. Cross-section of the flexured gimbal and strain gage sensing elements.

FIG. 4. Vertical sectional view of the flexured gimbal and strain gage sensing elements.

DESCRIPTION OF THE PREFERRED EMBODIMENT

Figure 5:
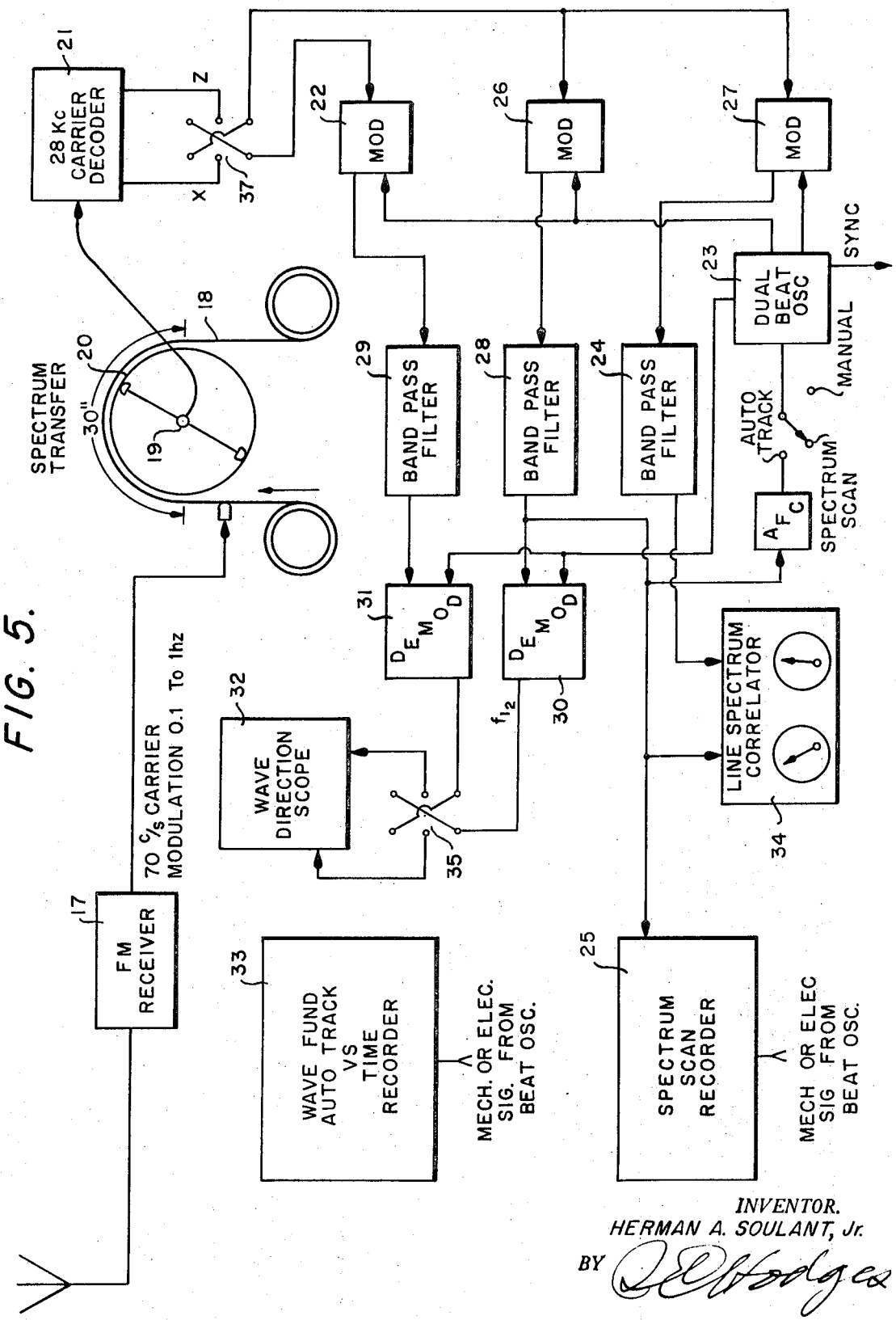
FIG. 5. Block diagram of the signal processing and displaying system.

In the following description, reference is made to classical wave theory and equations derived therefrom. The derivation of these classical equations can be found in the publically available United States Department of Commerce report "ESSA Technical Report ERL 118-POL3-2" entitled "An Introduction to Hydrodynamics and Water Waves, Volume II: Water Wave Theory." This report may be obtained from the U.S. Government Printing Office, Washington, D.C.

In accordance with the present invention, it is assumed that wind generated waves begin with a sawtooth-like profile.

As can be seen from the general equation for a sawtooth wave, equation 1, which may be found in any mathematical handbook, the sawtooth wave is a summation of a plurality of sine waves. Thus, the wave profile, at inception, begins a continuous change in shape because of the variation in the propagation velocities of the wavelength harmonically related sinusoidal components. The fundamental wave is a function of the windspeed, the fetch, and the energy dissipated by the water. The generated composite wave tends to dissipate its energy in the higher frequency components and store energy in the lower frequency wave components. Thus, striving to have a fundamental frequency with a propagation velocity approaching that of the exciting wind's velocity. At any time in the transition, the complex wave is limited so that its constituents can be readily defined from a knowledge of the frequency of the fundamental component. This limitation of the energy absorbed from the wind and of the form in which the energy is dynamically stored resides in two phenomena.

First when the stored energy causes a particle of the water to exceed a vertical acceleration of one $g$, water separation occurs with attendant energy dissipation. Second, when the slope of a wave exceeds a critical angle, reported to be given by the Stoke classical theory as 30°, sliding occurs with attendant dissipation of the energy in the wave. These limits are evident by appearance of white water, and as might be expected the higher frequency wave components are dissipated first.

For such an explanation of wind generated waves to be plausible it ought to agree with the accepted characteristics of waves. The sawtooth formation theory must reconcile the classic equations of pure sine waves in water with amplitude spectrum distribution data nearly following a "Rayleigh" curve, both of which have stood the test of experimentation. Also the explanation must agree with the observation of randomness in the sea.

The referred to reconciliation is explainable from the hypothesis that, at formation, the wind waves can be described by the equation of a sawtooth, equation (1), and that of the wave slope, equation (2). To a first order, these two equations can be used to provide details of the wave components at the instant of inception and to establish the respective amplitudes of the harmonically related wave components.

$$h = H\left[\sin\frac{2\pi}{L}x - \frac{1}{2}\sin\frac{2\pi}{L/2}x + \frac{1}{3}\sin\frac{2\pi}{L/3}x \ldots \frac{1}{n}\sin\frac{2\pi}{L/n}x\right] \quad (1)$$

and $$\frac{dh}{dx} = H\left[\frac{2\pi}{L}\cos\frac{2\pi}{L}x - \frac{1}{2}\frac{2\pi}{L/2}\cos\frac{2\pi}{L/2}x + \ldots \frac{1}{n}\frac{2\pi}{L/n}\cos\frac{2\pi}{L/n}x\right] \quad (2)$$

where $h =$ height of the water surface about the still water surface.

$H$ = peak height of the fundamental component.
$L$ = wavelength of the fundamental component.
$x$ = distance from a reference and in a direction perpendicular to the wave front.

In order to show that the present theory complies with experimentally obtained data, and since the hypothesis presumes that the sea is composed of a composite of sine waves, the classical theory applicable to such waves can be applied. Each wavelength harmonic component can be transferred to the time domain by applying the classical formula:

$$T = \sqrt{2\pi L/g} \qquad (3)$$

where
  $g$ = acceleration of gravity.
  $T$ = wave period of a component passing a fixed reference point.
  $L$ = wavelength of the fundamental component.

The periods of all the wavelength harmonics can then be given as tabulated below:

| Wavelength harmonic | Period of wavelength harmonic |
|---|---|
| Fundamental | $T_1 = \sqrt{\frac{2\pi L}{g}} = 1 \sqrt{\frac{2\pi L}{g}} = 1 \times T_1$ |
| 2nd | $T_2 = \sqrt{\frac{2\pi L/2}{g}} = \frac{1}{\sqrt{2}} \sqrt{\frac{2\pi L}{g}} = \frac{T_1}{1.41}$ |
| 3rd | $T_3 = \sqrt{\frac{2\pi L/3}{g}} = \frac{1}{\sqrt{3}} T_1 = \frac{T_1}{1.73}$ |
| 4th | $T_4 = \sqrt{\frac{2\pi L/4}{g}} = \frac{1}{\sqrt{4}} T_1 = \frac{T_1}{2.0}$ |

If the amplitudes of the wavelength harmonics are plotted as a function of their frequencies, the reciprocal of the period, and an envelope traced, the envelope should somewhat coincide with the Rayleigh shaped curve and a spectral analysis of actual wave measurements. FIG. 1 is the result. The sawtooth is a fit to the data as well as to the Rayleigh shaped curve. Indeed, the experimental data lies between the two theoretical curves. Perhaps the sawtooth envelope represents generation without losses and the Rayleigh curve represents equilibrium between energy absorbed from the wind and dissipated in the water. Actual measurement should and does fall between the two. At least from this test the sawtooth wave theory is plausible and will be more so if it fits the other criteria of observed randomness.

The characteristic of observed randomness in the sea is explainable with the sawtooth concept. Again with application of the classical theory, it is evident that all components of the formed sawtooth propagates at different speeds resulting in a constantly changing phase relation between the components.

The composite wave shape that is the summation of all the components is always changing. The repeat of a shape for a fleeting instant when all the phases repeat at a distant time is a function of the fundamental and the number of significantly existing wavelength harmonic components. The energy dissipation limiting factors already discussed have an importance here as they tend to reduce the harmonic components and cause a more frequently occurring shape.

From classical theory the propagation velocity ($v$) of a sinusoidal wave and therefore a sawtooth component, complies with the equation:

$$v = \sqrt{gL/2\pi} \qquad (4)$$

$g$ = acceleration of gravity.
$L$ = wavelength of the fundamental component.
Thus the wavelength harmonically related component must be proportional in velocity in the following manner:

$$v_1 : v_2 : v_3 : v_4 = 1 : 1/\sqrt{2} : 1/\sqrt{3} : 1/\sqrt{4}$$
$$= 1.000 : 0.707 : 0.577 : 0.500 \qquad (5)$$

The time interval required for the first harmonic component of a wave to over run the second harmonic component of the wave by a distance equal to one wavelength of the second harmonic is given by equation (6). The double subscripts denote the wave harmonic components involved, i.e., $T_{12}$ is the time required for the first harmonic component to over run the second harmonic component, and $T_{23}$ is the time required for the second harmonic component to over run the third harmonic component, etc. Thus, $$T_{12} = (L_1/2)/(v_1 - v_2) \quad \text{(double subscript denote harmonics involved)} \qquad (6)$$

substituting for $v$ from equation (4)

$$T_{12} = \frac{L_1/2}{\sqrt{gL_1} - \sqrt{gL_1/2}} = \frac{L_1/2 \sqrt{\frac{2\pi}{GL_1}}}{\sqrt{1} - \frac{\sqrt{1}}{2}} = \frac{1}{2}\left(\frac{\sqrt{2\pi L_1}}{\frac{g}{1 - \frac{\sqrt{1}}{2}}}\right)$$

substituting for L using equation (3)

$$T_{12} = \frac{T_1}{2\left[1 - \sqrt{\frac{1}{2}}\right]} = \frac{T_1}{2 \times 0.293} = 1.71 T_1$$

before there is phase coincidence between the first and second harmonics. Similarly for the second and third $$T_{23} = \frac{T_1/3}{\sqrt{\frac{1}{2}} - \sqrt{\frac{1}{3}}} = \frac{T_1/3}{.707 - .577} = \frac{T_1}{3(.130)} = 2.56 T_1$$

$$T_{34} = \frac{T_1/4}{\sqrt{\frac{1}{3}} - \sqrt{\frac{1}{4}}} = \frac{T_1}{4(.577 - .5)} = \frac{T_1}{4(0.077)} = 3.25 T_1$$

The product of the difference periods $$T_c = T_{12} \times T_{23} \times T_{34}$$
$$= 1.71 \times 2.56 \times 3.25 \; T_1^3 = 14.4 \; T_1^3$$

is the period of recurrence of a waveshape composed of four wave length harmonics.

If a 20 knot wind is blowing where the period of the fundamental wave length harmonic frequency component is approximately 6 seconds, it would be $14.4 \times 6^3$ seconds or 52 minutes before an observer would see an identical wave involving four harmonically related components. It is doubtful that an observer could maintain a phantasm that long while viewing all the inbetween shapes, each of which are different. Thus, a wind driven sea appears random. Again, the sawtooth theory is plausable.

Although seeming random, the sea, if defined to be sawtooth in formation, has order shown by the regular coincidence of phase and thus shape in a fashion just described. In other words, there is a beat which does not represent a wave component but instead is a regular change in shape such that a vessel underway into a sea engages the leading edge of sawtooth for an instant at one moment and later at another movement is running up a trailing edge. This alternates at a regular recurring period and for a sawtooth of two harmonics generated by a 20 knot wind the period would be every 10 seconds; for three harmonics also every 156 seconds.

Another aspect of this beat phenomena is that the coincidence of maximum slopes and maximum acceleration of each harmonic component could cause caps and thus the dissipation of excess or displaced energy in the spectrum as the fundamental of the generated wave approaches the wind speed. However, the higher frequency components are dissipated by the slope coincident first and therefore, acceleration caused dissipation seldom occurs. This frequency selective dissipation could explain the lack of fit in the curves of FIG. 1.

Another interesting aspect of the sawtooth theory is that all harmonic components have the same slope (as shown in equation (2)) and vertical acceleration amplitudes. In a slope or acceleration measurement, all harmonic components would share equally in the resolution capability of the electronic equipment. If it is assumed that only three wavelength harmonics are present in a wind maintained sea, each will equally share in the 30° slope limit without energy dissipation from the waves. Then any component will be limited in wave height. Thus, $$H = [g/(2\pi f)^2]\tan 10° = (vT/2\pi)(\text{Tan}10°)$$

which agrees with the measured wave heights of real seas as shown by comparison with "Wind Waves at Sea" nomography from Vine and Volkmann, Woods Hole Oceanographic Institute, June 1950.

A further refinement of the theory would take into account the fact that the sawtooth shape alternates in direction. This alternation caused by a continual change in wind to sea coupling modulates the wave components. Thus, if a spectral line curve, similar to FIG. 1 were made, there would appear at $f_1$, $1.4f_1$, $1.7f_1$, and $2f_1$, not a single line but a plurality of lines as shown for example, about $1.4f_1$.

To implement the above theory, a sensor buoy as shown in FIG. 2 is employed.

The sensor buoy includes a flat circular, highly buoyant, float 1 which stiffly follows the surface of the water thus assuming the wave slope. A shaft 2 attached perpendicular to and at the center of the float protrudes down into the water to terminate in a two degree of freedom, flexured gimbal 3. This gimbal is attached to the shaft 2 such that it maybe moved along the longitudinal axis of the shaft 2. The gimbal is further attached to an open end cylinder 4 at the mass center and the geometric center of the cylinder which coincide. This cylinder with the entrained water forms a system having a high rotary moment of inertia. The inertia along with the soft rotary spring of the gimbal flexures make up a low resonant system having a period of about 25 seconds. The cylinder thus tends to assume a perpendicular to the average slope of the water surface. The flexures 5, 6, 7 and 8 contain strain gages 9, 10, 11 and 12 (see FIGS. 3 and 4) and as they flex to allow the float to assume the slope of the water, a signal is developed from the strain gages. This signal is proportional to the slope of the wave, one signal for each of the two degrees of freedom. Properly conditioned and encoded these signals are emitted from the buoy by an FM radio transmitter 13 and transmitting antenna 15. The antenna also serves as a guide for the launching and retrieving hook 14. During launch and retreival the hook 14 slides up the antenna 15 thereby tightening the cable 16 causing cylinder 4 to slide up the shaft 2 and engage and lift float 1 and hence the buoy into or out of the water. An accelerometer (not shown) may be fastened to the cylinder so that the true vertical accelerations are sensed, and a magnetic compass maybe used on the float to develop an orientation signal. These may also be encoded and relayed through the radio transmitter. The signals will supply enough information to define the sea and its direction.

Once the sea waves have been converted to analogous signals and transmitted from the free floating sensor to a suitable receiving location, the signals must be examined for the appropriate descriptive characteristics. Dependent upon the circumstances, the receiving location might be a picket boat, a test vehicle itself, a land station, a helicopter, perhaps even a satellite. The extent of describing the waves is a function of the mariner's needs. In this particular instance it will be assumed that the waves are sensed in deep water and there will be no proximate reflected interference, and a knowledge of the basic sea, those waves being generated by the wind presently blowing, and of the swells, those waves arising in the area after travelling from some remote generating source is desired. The direction of either or both is also desired.

In order to obtain this information, a system such as pictured in FIG. 5 is necessary. This system operates as follows.

The composite signal of the X and Z slopes detected by the buoy, encoded and impressed on a carrier arrives at the FM receiver 17 as a 138 mc radio signal, FM modulated by a 70 hz center frequency, square wave shape subcarrier whose rate and symmetry are a function of the X and Z wave slopes.

The rate or frequency of the 70 hz center frequency square wave varies in frequency about the 70 hz center frequency with respect to the instantaneous wave slope $(dh/dx)$ in the + and − X directions and as sensed by strain gauges 9 and 11. The 70 hz center frequency square wave then FM modulates the 138 megacycle radio signal.

In addition, the symmetry of the 70 hz center frequency square wave is changed in response to the + and − signals received from strain gauges 10 and 12. These signals are responsive to the instantaneous wave slope in the + and − Z directions. Specifically, the instant of phase transition in the square wave is either advanced or retarded in response to positive or negative signals from the Z direction strain gauges, corresponding to positive or negative wave slopes in the Z direction. As the signals produced by the strain gauges are proportional to the slope of the wave in each of the respective directions X and Z, the carrier modulated by the 70 hz center frequency square wave contains information corresponding to the slope of the wave in the X direction and the slope of the wave in the Z direction, passing the buoy at any instant of time. This nominal 70 c/s subcarrier is placed on a magnetic tape 18 which in turn is scanned by scanning heads 19 and 20 at a rapid rate raising the 70 hz carrier to 28 Khz.

The wave information of interest are the waves generated by present wind and swells and are within the frequency range of 0.1 to 1 hz. The 70 hz carrier is then frequency modulated about a center frequency 70 hz at a rate of from 0.1 to 1 hz, depending upon the particular wave frequencies within this range. In addition, the symmetry of the square wave is changed and the point of phase transition of the square wave is varied about a center of the square wave period at a rate of 0.1 to 1 hz, depending upon the particular frequencies of the waves in the sea.

The 28 Kc carrier enters a decoder 21 which separates out the X and Z modulation so that there are two slope signals, each having a signal in the range of frequencies of 40 to 400 hz whereas the original wave information was in the frequency range of 0.1 to 1 hz. This set up is necessary to permit use of practical electrical methods to ascertain the frequency components present.

The signals out of the decoder are channeled through the reversing switch 37 to allow impressing the stronger on the modulator 26. A beat oscillator 23 is placed on spectrum scan and a signal appears at the bandpass filter 28 which allows only one beat component through to record an amplitude on the Spectrum Scan Recorder 25. As the best oscillator scans the frequencies, an amplitude vs frequency plot is developed on recorder 25.

The lowest frequency signal in the plot that has a companion signal 1.4 times higher in frequency is the "base" seaway signal. Other unrelated wavelength harmonic components as previously explained in the discussion on waves, are the "swells." These "swells" are wave generated a large distance from the presently explained waves and propagate into the test region. The oscillator 23, can be manually tuned to the "base" frequency, then shifted to automatic track. The X/Z signals of the base frequency passing through the modulators, 22 and 26, the band pass filters 28 and 29, and the demodulators 30 and 31 are impressed upon the wave direction scope 32 where their relative amplitudes acting at right angles on the scope form a line which gives the angle of the *base* wave with respect to the X and Z axis of the buoy. As and if the base wave changes in frequency the automatic track following it will be impressed upon recorder 33, thus giving a history of the base wave changes. From the sawtooth theory it is now possible with a knowledge of the base wave component to fully describe the generated sea as to components, height, beats and direction; also to assign an apparent "full sea generating" wind, which may be a product of the true wind, the duration, and the pitch.

In order to ascertain the "swell" direction, the oscillator can be tuned to detect the swell "frequency" and display it on the oscilliscope 32.

The indicator 34, in conjunction with modulator 27, filter 24 and oscillator 23 aid in identification of the frequencies, wavelength harmonically related to the "base" frequency. However, this feature necessitates a complicated coupling device in the beat oscillator to effect tracking of the wavelength harmonics.

Switch 37 mechanically linked to switch 35 is to correct the direction display on the oscilliscope 32 for effect created by exercising the option with 37.

Thus, this sea sensor and descriptor system measures the seas, extracts the fundamental constituents and presents them for use by the mariner.

OPERATION OF THE SYSTEM

As stated above, the lowest frequency component in the complex wave that possesses related harmonics and specifically a companion wave length related harmonic signal 1.4 times higher in frequency, is the "base" sea wave signal. This "base" signal is a fundamental frequency produced by present wind and has wave length related harmonics. It is obtained in the following manner.

Dual beat oscillator 23, as stated above, has two frequencies. The first frequency for the purposes of discussion is called $f1$ and the second frequency is $f2$. The signal at frequency $f1$ is connected to modulator 26 while the signal at frequency $f2$ is connected to modulator 27. Both modulators 26 and 27 are connected at any one time to either the X or the Z direction signals. Each of the bandpass filters for the purposes of the discussion are 100 Khz bandpass filters each having a bandwidth of 3 hz. The oscillator signals modulate the original wave information from the output of the 28 Khz carrier decoder producing 100 Khz upper side band components which are passed through the respective bandpass filters 28 and 24.

While the original wave energy is in a frequency range of 0.1 to 1 hz, this frequency range was translated by spectrum transfer to a range of 40 to 400 hz. The information out of the 28 Khz decoder are then discrete X and Z signals each having frequency components within a frequency range of 40 to 400 hz.

Modulating a signal at a frequency $f1$ from oscillator 23 with a wave signal at a frequency of 40 hz (corresponding to original wave frequency of 0.1 hz) will produce a 100 Kc upper side band, passed by filter 28.

Similarly, in order for 100 Khz filter 24 to pass the first wave length harmonic of the input to modulator 27, f2 from oscillator 23 must be related to $f1$ by the harmonic relationship of the fundamental wave and its first wave length harmonic. The wave length harmonic is 1.4 times the fundamental frequency. The first harmonic is then $1.4 \times 40$ hz $= 60$ hz. The frequency $f2$ of the dual beat oscillator must then be 99.940 so the upper carrier produced by modulator 27 is 100 Kc $(99.940 + 60 = 100$ Khz$)$.

The upper range of the dual beat oscillator for a signal, out of the decoder 21, of 400 hz (corresponding to the upper limit of the original wave information of 1 hz and representing a first harmonic) is 99.6 Kc. A 400 hz signal out of the decoder 21 combined with 99.6 Khz ($f2$) from oscillator 23 then produces a 100 Kc signal which is passed by filter 24. The subharmonically related signal $f1$ or fundamental wave frequency would then be 99.710 Kc $(1.4 \times 280 + 99.710$ Kc $= 100$ Kc$)$. The output of bandpass filters 28 and 24 are then wave length harmonically related signal.

These signals are inputted to line spectrum correlator 34 which reads the amplitude of these signals corresponding to the slope of the wave. The wave length related harmonics will have equal slope values and will be displayed as equal amplitudes on the line spectrum correlator 34.

Tuning the dual beat oscillator from its low towards its high range to produce substantially equal amplitude indications at the line spectrum correlator 34 will indicate the fundamental wave frequency and its first wave length related harmonic. This procedure is carried out for the discrete signals from the decoder 21 in the X and Z directions.

The frequency spectrum of the wave information in either the X or Z direction may be separately viewed on spectrum scan recorder 25. This is accomplished by connecting signals from the decoder 21 in either the X or the Z direction to modulator 26. The spectrum scan recorder plots the slope of the wave (amplitude = $dh/dx$) with respect to frequency. When the X signal is connected to the input of modulator 26 a signal is passed from modulator 26 through bandpass filter 28 and to the spectrum scan recorder 25 each time the decoded signal from decoder 21 combined with the oscillator signal $f1$ produces a 100 Khz upper side band. The dual beat oscillator is swept from its lowest frequency to its highest frequency, corresponding to the lowest and highest wave information frequencies to produce a series of outputs from bandpass filter 28 corresponding to the appearance of wave information in the frequency spectrum. If the frequency plane of the spectrum scan recorder is correlated to the sweep of the dual beat oscillator, then the frequency of each amplitude appearing on the spectrum scan can be ascertained. The beat oscillator can be scanned manually or may be motor driven.

The frequencies appearing in the spectrum scan recorder will be the fundamental and harmonics of present wind generated waves and frequencies corresponding to the "swell" waves. These swell as described previously, are waves generated by wind remote and at a great distance from the immediate sea area under investigation. These swells can be identified from a spectrum scan as the amplitudes at frequencies below the fundamental frequency of the present wind driven waves. The direction of these swells can be displayed and the change in frequency tracked by turning the oscillator 23 to produce a 100 Khz upper side band when combined with either the X or Z swell signal. The oscillator 23 is then placed into the automatic track mode for tracking a 100 Khz upper side band. The X and Z wave signals, modulated by the oscillator signal to produce 100 Khz upper side bands at modulators 22 and 26 respectively, are passed through bandpass filters 29 and 28 and demodulators 30 and 31 and are impressed upon the wave direction scope 32. When the signal of the demodulator 31 corresponding to the swell in the X direction and a signal from demodulator 30 corresponding to a swell in the Z direction and at the same frequency as the swell in the X direction is impressed upon the X and Y axis of the wave direction scope 32 respectively a resultant line image will be formed giving the angle of the wave with respect to the X and Z axis of the buoy and the buoy direction. If the swell wave changes in frequency, the automatic track of oscillator 23 following it will be impressed upon recorder 33 giving a history of the frequency change in the swell wave. In a similar manner, by turning the oscillator to produce a 100 Khz upper side band when modulating the X or Z fundamental or harmonic signals, information of the direction of these signals may be obtained.

Using this system, the following information is obtained of the components of the complex wave:

1. the direction of the swell wave components;
2. the direction of the present wind sea wave components;
3. the frequencies of the X and Z components of the fundamental and harmonic wave components;
4. the frequencies of the X and Z components of the swell wave components;
5. the changes in the frequency of specific wave components with respect to time;
6. identification of the slopes of the present wind sea waves and the slopes of the swells.

Utilizing the equations (1) and (2), equation (3), and equation (7), it is possible to mathematically reconstruct the wave from this information.

To one skilled in the art many modifications and variations of the present invention are possible after reviewing the above disclosure. It is therefore to be understood that the invention is described within the scope of the following claims.

What is claimed is:

1. A system for analyzing a complex ocean wave in the open sea, comprising:
   first means for generating signals responsive to the motion of the wave;
   second means connected to said first means for detecting said signals;
   third means connected to said second means for generating and displaying the frequency components of the complex wave; and
   fourth means connected to said second means for generating and indicating wave length harmonically related frequency components of said complex wave.

2. The system of claim 1, including:
   means for displaying the direction of the components of the complex wave.

3. The system of claim 2, including:
   means for displaying the change in frequency of at least one said wave component.

4. The system of claim 3, wherein:
   said signals produced by said first means are indicative of the motion of the wave components in at least two respective directions.

5. The system of claim 4, wherein:
   said signals produced by said first means are indicative of the slope of the said wave components in at least two directions.

6. The system of claim 5 wherein:
   said third means for displaying frequencies of the components of the complex wave includes means for separately displaying each discrete frequency and respective slope amplitude component.

7. The system of claim 6, wherein:
   said fourth means is a dual beat oscillator having a first frequency $f1$ and a second frequency $f2$;
   a plurality of modulators connected to said second means, each of said modulators connected to receive a discrete signal corresponding to one of the two respective directions and each of said modulators connected to a respective output of said dual beat oscillator;
   said oscillator outputs $f1$ and $f2$ beating with said modulator input signals to generate output signals representing wave length related harmonics;
   a filter connected to the output of each of said modulators for selecting said wave length related harmonic representative signals and passing said harmonics to a signal level displaying means; wherein said signal level display means displays the discrete outputs of said filters for indicating equal slope amplitudes of said wave length related harmonics for determination of the fundamental and second wave length harmonically related frequency components of said complex wave.

8. The system of claim 6, wherein:

said means for displaying the direction of said complex waves is a two ordinate recorder having respective $x$ and $y$ inputs;

at least two modulators, each modulator connected to a respective output of said second means, each of said second means outputs corresponding to each of said two respective directions;

a beat oscillator having a frequency for beating with said respective modulator input signals to produce modulator output signals at substantially the same frequency;

bandpass filters connected to each modulator output for selectively passing said modulator output signals;

said $x$ and $y$ inputs of said recorder each connected to a respective bandpass filter output for displaying the direction of the wave resultant from the component waves in the two directions.

9. A method of analyzing the wave components of a complex wave in the open sea, comprising:

generating discrete signals responsive to the motions of the open sea wave;

detecting the discrete frequency components of said signals;

separately displaying each of said discrete frequency components in a frequency spectrum; and indicating the wind generated fundamental and wave length related harmonic frequency components of said signals.

10. The method of claim 9, wherein:

said step of generating discrete signals includes the step of generating at least two separate signals responsive to the slope of the wave in at least two respective directions.

11. The method of claim 10, including the step of:

vectorally adding the component signals at the fundamental frequency and corresponding to each said respective direction to determine the direction of the complex wave.

12. The method of claim 11, including the step of:

identifying the spectrum frequencies corresponding to the swells having frequencies below the fundamental and wave length related harmonic wind component frequencies.

* * * * *